L. E. RIGOTARD.
LUBRICATING BEARING.
APPLICATION FILED JUNE 24, 1918.
1,311,247.
Patented July 29, 1919.
Fig.1.
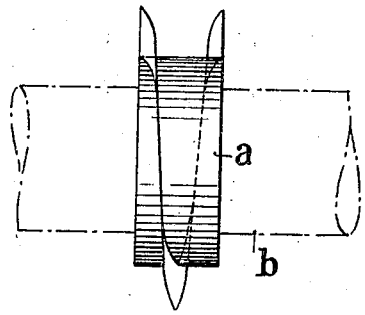
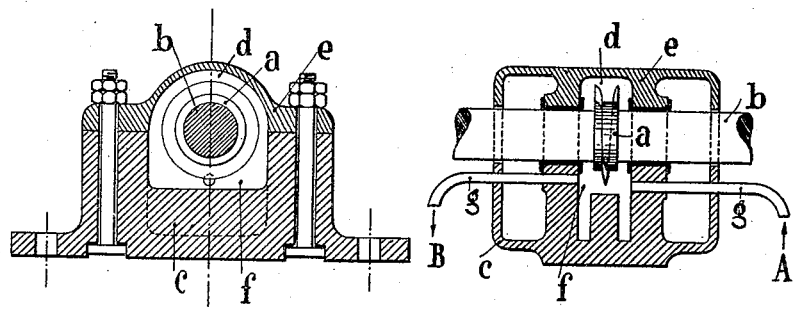
Fig.2.   Fig.3.
Inventor:-
Laurent Eugène Rigotard,
By:- B. Singer,
Atty.

UNITED STATES PATENT OFFICE.

LAURENT EUGÈNE RIGOTARD, OF PARIS, FRANCE.

LUBRICATING-BEARING.

1,311,247. Specification of Letters Patent. Patented July 29, 1919.

Application filed June 24, 1918. Serial No. 241,667.

*To all whom it may concern:*

Be it known that I, LAURENT EUGÈNE RIGOTARD, a citizen of the Republic of France, residing at 66 Rue Gay-Lussac, Paris, France, have invented new and useful Improvements in Lubricating-Bearings, of which the following is a specification.

My invention relates to a lubricating bearing in which a motor oil ring is rotating, said ring being formed with a helical extension and a convenient thread having for effect to facilitate the circulation of the lubricating medium in the bearing body.

With the big rotating speeds now obtained, it results that the use of lubricating bearings in which a flowing of oil is circulating, offers great advantages having for effect to generalize the use of same. In such bearings, the oil is actuated through a special pump constituting a part of the lubricating group.

With my device it is possible, by single wedging of the special ring on the shaft, avoiding the use of pumps until now used, while the circulation of oil through the bearing to be lubricated is obtained automatically by its rotation.

In the drawings to which it is referred—

Figure 1 shows only the element or ring while

Figs. 2 and 3 show respectively in a longitudinal and a transversal section, an application of said element or ring to a bearing body.

Referring to the drawings, a ring *a* being formed in one or several pieces is shrunk on the shaft *b* mounted in the bearing *c*. This ring *a* is located in a convenient recess *d* of a cape *e* and in a convenient corresponding recess *f* of the bearing *c*. Afore mentioned ring involves the circulation of the oil in the pipes *g* and *h* presenting an inlet in A and an outlet in B in order to permit various bearings to be lubricated to communicate with each other, and also the cooling medium for oil if necessary. This arrangement of a motor oil ring in a bearing has for effect avoiding the use of a special circulating pump.

It will be seen that a group of these bearings will keep the oil in circulation and entirely eliminate the necessity for a separate pump. The ring effecting the circulation of oil may be constituted by means of paddles or helical extensions, the helical thread of which may be varied according to the rotating speeds to which they are applied, or any other arrangement capable of automatically producing the circulation of oil through the bearing may be provided, as for instance, grooves in the outer face of the shaft and arranged in screw formation. It is understood that the helical thread of the ring may be on the right side as well as on the left side, in order to obtain a circulation on each way and the bearing may also comprise the application of two rings instead of a single, without altering the spirit of the invention.

What I claim is:—

1. A lubricating bearing including a casing having a two-part bearing and a space therebetween, a shaft mounted in said bearing, and a helicoidal ring member on said shaft and arranged within said space, said helicoidal ring member being formed to move fluid across said space and in a direction parallel with said shaft when said shaft is rotated.

2. A lubricating bearing including a casing having a two-part bearing and a space therebetween, a shaft mounted in said bearing, a helicoidal ring member on said shaft and arranged within said space, said helicoidal ring member being formed to move fluid across said space and in a direction parallel with said shaft when said shaft is rotated, and an intake duct leading to said space and an outlet duct leading from said space.

In testimony whereof I have hereunto set my hand, in presence of two subscribing witnesses.

LAURENT EUGÈNE RIGOTARD.

Witnesses:
CHAS. P. PRESSLY,
MARCEL VANDERHEYM.